2,824,012

METHOD OF PREPARING PRESERVED PIMIENTOS

Harold K. McLaughlin, Ventura, Calif., assignor to Coastal Valley Canning Co., a corporation of California No Drawing. Application August 8, 1956
Serial No. 602,922

5 Claims. (Cl. 99—186)

The present invention relates generally to a method of preparing pimientos for canning and more particularly to a flow line method of processing pimientos in order to convert them into a preserved state satisfactory for storage in various type containers over extended periods of time.

At the present time the most conventional method for preserving or sterilizing pimientos involves a process in which the pimientos are first sealed in small cans. Thereafter, the cans are placed in high temperature retorts or pressurized vessels in which they are heated for a sufficient length of time at a temperature exceeding 212° F., such that the pimientos will be sterilized with a destruction of spoilage organisms which might be present. With such a procedure, it will be appreciated, however, before the innermost pimientos (usually in diced form) attain sterilization temperatures that the pimientos adjacent the walls of the cans may possibly be overcooked. In other words, the pimientos in proximity to the side walls of the cans will tend to become gelatinous and not effectively retain proper firmness of body and particle shape. It is further evident, in the light of the latter disadvantage of this method, that the process is not adaptable to preserving requirements for commercial consumers where large cans or barrels of sterilized pimientos are desirable for efficient production requirements. Thus, at the cost of additional labor and time, it is oftentimes necessary for such consumers to order and open a large number of small cans in order to obtain their large quantity requirements. It is apparent, therefore, that considerable savings could be effected if larger sized cans of preserved pimientos were available to this type of important consumer.

Another method which has been employed in the preservation of pimientos includes a fermentation process taking from three to four weeks in time, in which the pimientos are first soaked in relatively concentrated sodium chloride brine and then allowed to ferment until all sugar has been removed. This process has the disadvantage of lowering the solid content in the pimiento to nearly two percent and changing the pimiento into a form undesirable for some uses.

More recently, a patented method has been developed in which the pH of the pimientos, normally between 4.9 and 5.0, is reduced to below 4.6 by the addition of 15 to 20% by weight of sodium chloride. The sodium chloride is added to the diced pimientos after cleaning and before thermal processing. Although the action of the sodium chloride is not completely understood, it has been found that it does have the effect of lowering the pH to below a value of 4.6 such that the pimiento-salt mixture may be preserved by heating to a pasteurizing temperature in the range of 140° to 160° F. for a relatively short period of time.

Although this latter method of adding salt to the pimientos overcomes the major disadvantages of the more conventional methods heretofore described, the addition of salt inherently requires a further step in the processing with additional resultant expense and material. It is also believed, in certain subsequent product uses of the pimientos, that the salt content may detract to a limited extent from the edible qualities of the pimientos.

It is, therefore, an object of the present invention to provide a method of preparing preserved pimientos such that they may be stored in any size hermetically sealed container for extended periods of time, and yet a method in which the color of the raw fruit and the body texture is retained without appreciable change.

Another object of the present invention is to provide a method of preparing preserved pimientos, in which the pimientos may be processed efficiently and relatively quickly on a continuous or flow-line basis without the need of additives to increase the acidity content in the pimientos.

Generally the process of preserving pimientos according to the present invention involves initially converting the pimientos, after they have been peeled, cleaned and diced, to a form comprising a pumpable mixture. Towards this objective, a most convenient and economical method is to utilize the natural juice of the pimientos as a medium necessary for supporting the flow of the diced pimientos. It will be appreciated that juice is always formed from the pimientos during conventional thermal processing, although heretofore it has not been used as a means of shortening the processing time or for flow purposes.

By using the natural juice as a medium or vehicle for the flow of the diced pimientos, they may then thereafter be heated more quickly and effectively without the possibility of destroying their texture or color in various types of tubular pasteurizers or similar equipment.

A preferred process for carrying out the method of the present invention involves taking the usual peeled, cleaned and diced pimientos and pre-heating them in an open kettle to a temperature sufficiently high enough to form the natural pimiento juice without effecting any change in the firm texture of the pimiento or varying its clear, bright red color. It has been found that a temperature of 160° to 170° is most desirable for this pre-heating step and effectively results in accomplishing the objectives just stated.

After the latter pre-heating step, the diced pimientos, as a consequence of their suspension in their own juice, may be pumped through a pipe or conduit to an equipment to effect the necessary sterilization. For this purpose, a tubular pasteurizer, as it is known in the art, may be employed. A pasteurizer of this type comprises a plurality of continuous tubular lengths nested within a cylindrical vessel. Pressurized steam is contained within the vessel and envelops and surrounds the lengths of tubular pipe. With such an equipment, the pimientos and juice mixture are continually passed through the several lengths of pipe within the vessel so that the mixture is quickly and effectively heated to a high temperature. The sterilization may be usually effected if the temperature of the pressurized steam is maintained at approximately 240° F., depending, of course, upon the period of time during which the pimiento and juice mixture is subjected to this temperature as it passes through the continuous length of nested tubes. Generally, in a conventional pasteurizer, one to three minutes of heating at 240° F. is sufficient to accomplish the necessary sterilization for subsequent sealed storage of the pimientos over an extended period of time. It will be realized, of course, that the steam pressure used, the flow rate, and the capacity of the equipment are all factors which will vary the time required for the necessary sterilization.

As a consequence of converting the pimientos into a pumpable mixture in their own juice, it will appreciated that the former requirement of using a batch-like operation is no longer necessary, and that consequently a more efficient and economical continuous flow production process may be utilized as described. As a consequence of this improved method, it is evident that it is no longer necessary to transfer heat through several layers or thickness of diced pimientos adjacent the outer walls of the container in order to sufficiently heat the more centrally located inner pimientos. In using a tubular type heating equipment, substantially all the diced pimientos will be subjected to the same temperature during any given period of time. Thus, the possibility of overheating and possible damage to the texture or color of certain of the pimientos is eliminated.

After the pimientos have been passed through the tubular pasteurizer to effect the necessary sterilization, they may then be passed through a conventional cooling section to bring the temperature down to a point below 212° F. In some instances, to effect sterilization, it may also be necessary to pass the pimientos through a holding section to obtain the higher temperature of 240° F. intermediate of the pasteurizing and cooling steps.

Once the pimientos have been cooled, they may be stored in any type of conventional sealed container according to the particular consumer requirements. In most instances, they will be deposited in large cans which are hermetically sealed by the usual double seal process.

It will be appreciated that various changes may be made with respect to temperatures used and related periods of time during the sterilization process so long as effective sterilization is accomplished without detracting from the texture or color of the pimientos. Other changes and modifications can also be made in the method of the present invention without departing from the spirit and scope of the inventive features as previously described and set forth in the following claims.

What is claimed is:

1. A method of processing pimientos to convert them into a preserved state for subsequent storage in sealed containers, comprising the following steps: peeling, cleaning, and dicing the pimientos; preheating the pimientos sufficiently to extract natural juice therefrom and effect the formation of a pumpable mixture; heating said mixture under flow conditions sufficiently to cause sterilization of said pimientos.

2. A method of processing pimientos to convert them into a preserved state for subsequent storage in sealed containers, comprising the following steps: peeling, cleaning, and dicing the pimientos; preheating the pimientos sufficiently to extract natural juice therefrom and effect the formation of a pumpable mixture; and passing said mixture through tubing; and heating said tubing sufficiently to cause sterilization of the pimientos in said mixture.

3. A method of processing pimientos to convert them into a preserved state for subsequent storage in sealed containers, comprising the following steps: peeling, cleaning, and dicing the pimientos; preheating the pimientos to a temperature of 160° F. to 170° F., whereby natural juice is extracted from the pimientos to form a pumpable mixture; passing said mixture through tubing; and heating said tubing sufficiently to cause sterilization of the pimientos in said mixture.

4. The method according to claim 3, and the additional step of cooling said mixture to a temperature below 212° F.

5. A method of processing pimientos to convert them into a preserved state for subsequent storage in sealed containers, comprising the following steps: peeling, cleaning, and dicing the pimientos; preheating the pimientos to a temperature of 160° F. to 170° F., whereby natural juice is extracted from the pimientos to form a pumpable mixture; passing said mixture through a first portion of tubing; heating said first portion of tubing to a temperature of approximately 240° F., whereby the pimientos in said mixture are sterilized; passing said mixture through a second portion of tubing; and cooling said second portion of tubing sufficiently such that said mixture decreases in temperature to a point below 212° F.

References Cited in the file of this patent
UNITED STATES PATENTS

| | | |
|---|---|---|
| 2,541,113 | Smith et al. | Feb. 13, 1951 |
| 2,649,378 | Traisman et al. | Aug. 18, 1953 |